(12) United States Patent
Hoffman et al.

(10) Patent No.: US 7,604,543 B2
(45) Date of Patent: Oct. 20, 2009

(54) SPLINE CONNECTION (75) Inventors: Joachim Hoffman, Wooster, OH (US);
Todd Sturgin, Shreve, OH (US);
Jean-Francois Heller, Strassburg (FR)

(73) Assignee: Luk Lamellen und Kupplungsbau Beteiligungs KG, Buehl (DE)

( * ) Notice: Subject to any disclaimer, the term of this patent is extended or adjusted under 35 U.S.C. 154(b) by 406 days.

(21) Appl. No.: 11/509,183

(22) Filed: Aug. 24, 2006

(65) Prior Publication Data
US 2007/0048082 A1    Mar. 1, 2007

Related U.S. Application Data (60) Provisional application No. 60/711,240, filed on Aug. 25, 2005.

(51) Int. Cl.
*F16F 15/121* (2006.01)

(52) U.S. Cl. .................................. 464/66.1; 403/359.4

(58) Field of Classification Search ................ 464/66.1, 464/68.1; 403/359.2, 359.4, 359.5; 74/440; 192/213
See application file for complete search history.

(56) References Cited

U.S. PATENT DOCUMENTS 1,240,126 A * 9/1917 Dubois ................... 464/66.1 X
1,361,035 A * 12/1920 Farnum ................. 464/66.1 X
4,106,360 A * 8/1978 Manna ........................ 74/440
4,785,924 A   11/1988 Jäckel
5,964,329 A   10/1999 Kawaguchi et al.

* cited by examiner

*Primary Examiner*—Greg Binda
(74) *Attorney, Agent, or Firm*—Simpson & Simpson, PLLC (57) ABSTRACT

An assembly for improving a connection between splined assemblies generally includes first and second assemblies each having at least one spline thereon, an integral fastening assembly for axially fastening the first assembly with respect to the second assembly, and a biasing assembly for asserting a force to oppositely rotationally dispose the first and second assemblies with respect to one another. In an embodiment, the first and second assemblies are annular plates. A method for improving a connection between splined assemblies generally includes asserting a bias upon first and second assemblies such that are oppositely rotationally disposed with respect to one another. In the above method, the first assembly and the second assembly each have at least one spline, an integral fastening assembly for axially securing the first and second assemblies, and a biasing assembly. In an embodiment of the above method, the first and second assemblies are annular plates.

12 Claims, 10 Drawing Sheets

SPLINE CONNECTION

CROSS REFERENCE TO RELATED APPLICATIONS

This patent application claims the benefit under 35 U.S.C. §119(e) of U.S. Provisional Application No. 60/711,240, filed Aug. 25, 2005, which application is incorporated herein by reference.

FIELD OF THE INVENTION

The present invention generally relates to improvements in connection assemblies for reducing vibration in devices generally subject to rotational motion, and more particularly, to improvements for reducing lash between spline connections of shafts, hubs and like structures, and vibration noise.

BACKGROUND OF THE INVENTION

Clutches and torque converters transmit rotational forces between an engine and a vehicle transmission while simultaneously dampening undesirable vibration and noise. One undesirable vibration commonly results from lash in power transmission systems. There are various sources of lash; however, one source comprises the connection between a splined shaft or hub and a complementary fitting assembly. Generally, lash occurs as a result of the presence of small spaces between the splines of a rotating shaft or hub and the splines of a rotating complementary fitting assembly, e.g. a toothed gear or the like. The small spaces tend to allow the splines, or teeth, of two structures to violently collide with one another when there is a change in the relative motion therebetween, for example, when there is a change in torque. While splined shafts or hubs and their complementary fitting assemblies are primary sources of lash and vibration noise, other structures can also produce lash, for example, loosely riveted connections between rotating plates.

What is needed then is an improved assembly for reducing lash in spline connections, and to a lesser extent, vibration noise.

BRIEF SUMMARY OF THE INVENTION

The present invention broadly comprises an assembly for improving a spline connection including a first assembly comprising a first at least one spline; a second assembly comprising a second at least one spline; an integral fastening assembly arranged to axially fasten the first assembly with respect to the second assembly; and a biasing assembly arranged to oppositely rotationally dispose the first and second assemblies with respect to one another. In some aspects, the first assembly and the second assembly are each annular and the first and second plate assemblies have first and second inner and outer circumferences, respectively. The first and second at least one spline are disposed on the first and second outer circumferences, respectively, or the first and second inner circumferences, respectively.

In some aspects, the biasing assembly is arranged to rotationally misalign the first and second at least one spline. The biasing assembly is configured to have a range of motion and said first and second at least one spline are alignable within the range of motion. In some aspects, the biasing assembly comprises at least one compression spring and at least one spring receiving assembly. The at least one compression spring and the at least one spring receiving assembly are tangentially disposed about the first and second plate assemblies. In some aspects, the at least one spring comprises first and second ends connected to the first and second plate assemblies, respectively and the at least one spring receiving assembly comprises a first pin on the first plate assembly and a second pin on the second plate assembly. The first and second pins are arranged to receive the first and second ends, respectively. The first pin is oriented in a first rotational direction and the second pin is oriented in a second rotational direction opposite the first direction.

In some aspects, the fastening assembly comprises a protruding member disposed on one of the first and second plate assemblies and a receiving aperture disposed on the other of the first and second plate assemblies. The first plate assembly can be rotatably securable to the second plate assembly. The first plate assembly can be translationally securable to said second plate assembly.

The present invention also comprises a method for improving a spline connection.

It is, thus, an aspect of the invention to provide an assembly and method for improving a spline connection so as to prevent and/or minimize lash between a shaft, hub or the like, and a complementary fitting assembly.

It is another aspect of the present invention to provide an improved spline connection assembly that prevents and/or minimizes rattle noise.

These, and other aspects, features and advantages of the present invention will be readily appreciable from the following description of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which:

FIG. 10 is a front view of a spline connection according to the invention in a biased state; and, FIGS. 11-12 are front views of an alternative spline connection according to the invention; and.

DETAILED DESCRIPTION OF THE INVENTION

At the outset, it should be appreciated that like drawing numbers on different drawing views identify identical, or functionally similar, structural elements of the invention. Also, while the present invention is described with respect to what is presently considered to be the preferred aspects, it is to be understood that the invention as claimed is not limited to the particularly disclosed aspects. Indeed, while the present invention is described in the context of annular plate assemblies, the invention is not limited to such assemblies.

Adverting now to the figures, as illustrated in FIGS. 1-12, spline connection assembly 10 is illustrated as broadly comprising first assembly 12, second assembly 14, integral fastening assembly 16 and biasing assembly 18. In the embodiment illustrated, first assembly 12 and second assembly 14 each comprise annular plates having a plurality of identically sized splines 22 and grooves 24 disposed on their inner circumferences. It should be appreciated that while first assembly 12 and second assembly 14 are illustrated as comprising a pair of annular plates, the invention is not limited to plates or ringed structures. Also, it should be appreciated that for purposes of clarity, first assembly 12 and second assembly 14 may, hereinafter, be referred to as first plate assembly 12 and second plate assembly 14.

As viewed more clearly by reference to FIGS. 1-6, first plate assembly 12 is illustrated as comprising friction material 20 having channels 21 disposed therethrough. Channels 21 communicate with apertures 26. Apertures 26 are disposed about a radius of the first plate assembly and are configured for receiving protruding members 34 of fastening assembly 16. First plate assembly 12 also includes a plurality of recesses 28, which form part of biasing assembly 18. Recesses 28 include pins 30 for securing a first end of one of compression springs 32 of the biasing assemblies. In the embodiment illustrated, four (4) recesses are disposed about the first plate assembly at approximately 90 degree intervals. Pins 30 of each recess 28 maintain a similar rotational orientation about the first plate assembly.

As illustrated more clearly in FIGS. 1-4 and 7-8, second plate assembly 14 is illustrated as comprising protruding members 34, recesses 36, pins 38, splines 22 and grooves 24. Protruding members 34 are disposed about a radius of the second plate assembly and are configured for receipt in apertures 26 of the first plate assembly. In the embodiment illustrated, four (4) protruding members 34 are disposed about the second plate assembly at approximately 90 degree intervals and are arranged for receipt in four apertures 26 of the first plate assembly. Protruding members 34 generally include base portion 40 and blade portion 42. In the embodiment illustrated, base portion 40 is integral with the outer circumference of the second plate assembly and the blade portion extends therefrom. Blade portions 42 maintain a same rotational orientation about the second plate assembly and allow the second plate assembly to be rotatably secured to the first plate assembly. The length of the base portions is smaller than the length of apertures 26 such that the first and second plates can rotate relative to one another when assembled. In the embodiment illustrated, second plate assembly 14 also includes four (4) recesses 36 that are disposed at approximately 90 degree intervals about the second plate assembly. Pins 38 of each recess 36 are arranged for receiving a second end of one of compression springs 32. Pins 38 maintain a similar rotational orientation about the second plate assembly, which is opposite to the rotational orientation of pins 30 of the first plate assembly.

As seen more clearly in FIGS. 1-8, fastening assembly 16 is generally provided for preventing the axial separation of the first and second plate assemblies from one another while simultaneously allowing a degree of relative rotational movement therebetween. Fastening assembly 16 generally comprises apertures 26, which are disposed in the first plate assembly, and protruding members 34, which protrude from the second plate assembly. As discussed, supra, apertures 26 are disposed at regular intervals about a radius of the first plate assembly and are configured for receiving protruding members 34 therein. Protruding members 34 are disposed at approximately 90 degree intervals about the second plate assembly and include base portions 40 and blade portions 42. Blade portions 42 maintain a same rotational orientation about the second plate assembly and allow the second plate assembly to be rotatably secured to the first plate assembly. The length of the base portions is smaller than the length of apertures 26 such that the first and second plates may be secured to one another and rotate relative to one another. In an assembled state, blade portions 42 generally extend beyond an edge of apertures 26 to axially secure the first and second plate assemblies to one another.

As viewed more clearly in FIGS. 1-10, biasing assembly 18 is provided for oppositely rotationally disposing the first plate assembly with respect to the second plate assembly such that any gaps that may exist when the assembly is connected to a spline, may be closed. Biasing assembly 18 generally comprises a plurality of recesses 28 disposed about an inner circumference of first plate assembly 12, a plurality of recesses 36 disposed about and inner circumference of second plate assembly 14, and a number of compression springs 32. In the embodiment illustrated, recesses 28 and 36 are of the same size and shape and comprise pins 30 and 38, respectively. Pins 30 and 38 are oppositely oriented with respect to one another and are configured for receiving opposite ends of compression springs 32 thereon. Formed pockets also may be used to retain the springs. Compression springs 32, thus, serve to bias the first and second plate assemblies such that they are rotationally oppositely disposed with respect to one another. It should be appreciated that while recesses 28 and 36 of each of the first and second plate assemblies are disposed about their respective plates at approximately 90 degree intervals and are of a same size and shape, recesses 28 and 36 are offset with respect to one another between the first and second plate assemblies such that the two plate assemblies may be oppositely rotationally disposed. In other words, when splines 22 and grooves 24 of the first and second plate assemblies are aligned with one another, recesses 28 and 36 are misaligned, or offset, with respect to one another (see FIG. 12). Similarly, when recesses 28 and 36 are aligned with one another, splines 22 and grooves 24 of the two plate assemblies are rotationally misaligned with respect to one another (see FIG. 11). When the splines and grooves of the two plate assemblies are aligned, the assembly may be referred to be as maintaining the biased state, since a counterforce must be applied to overcome the bias of the compression springs to align the splines and grooves. The state wherein the splines and grooves of the two plate assemblies are misaligned may be referred to as the rest, or resting, state as expansion of compression springs 32 is limited by the side walls of recesses 28 and 36.

Figure 11:
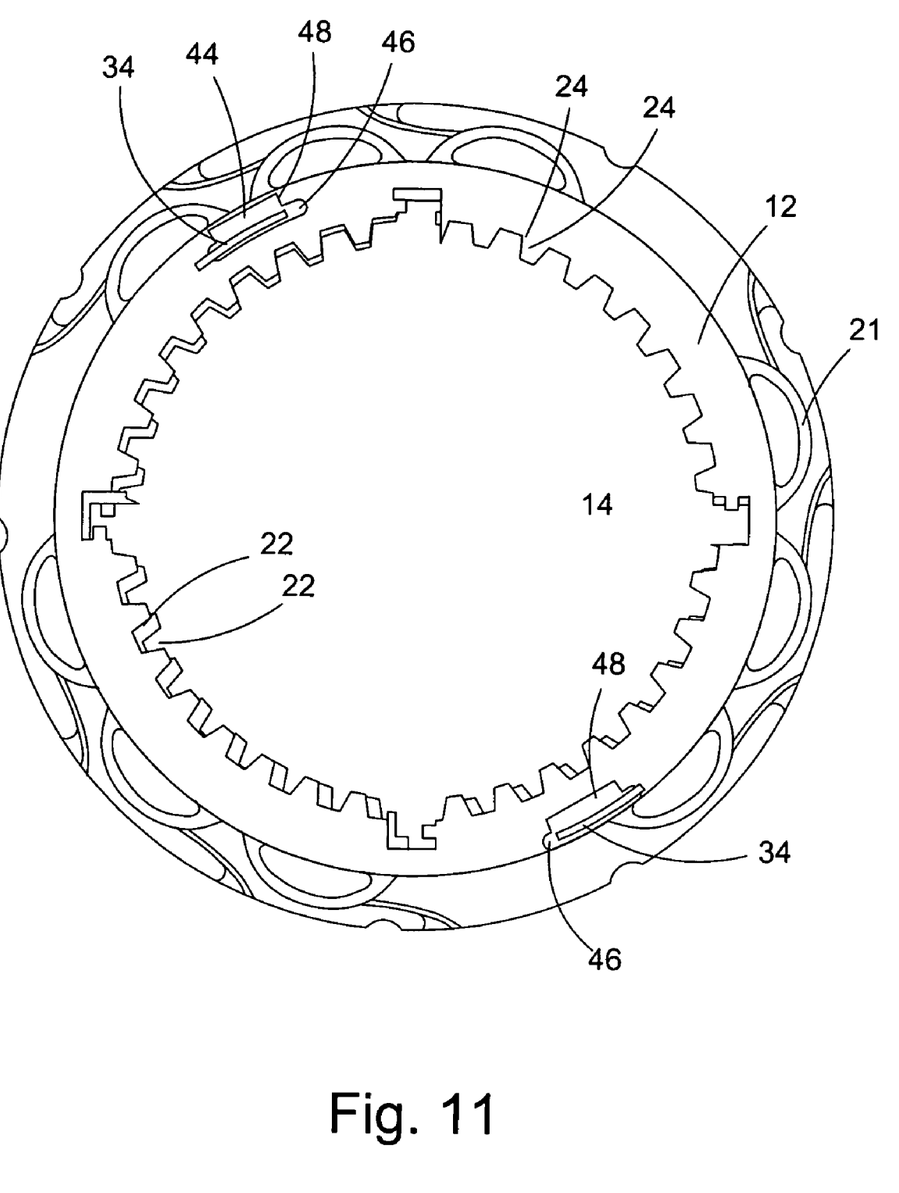
Figure 12:
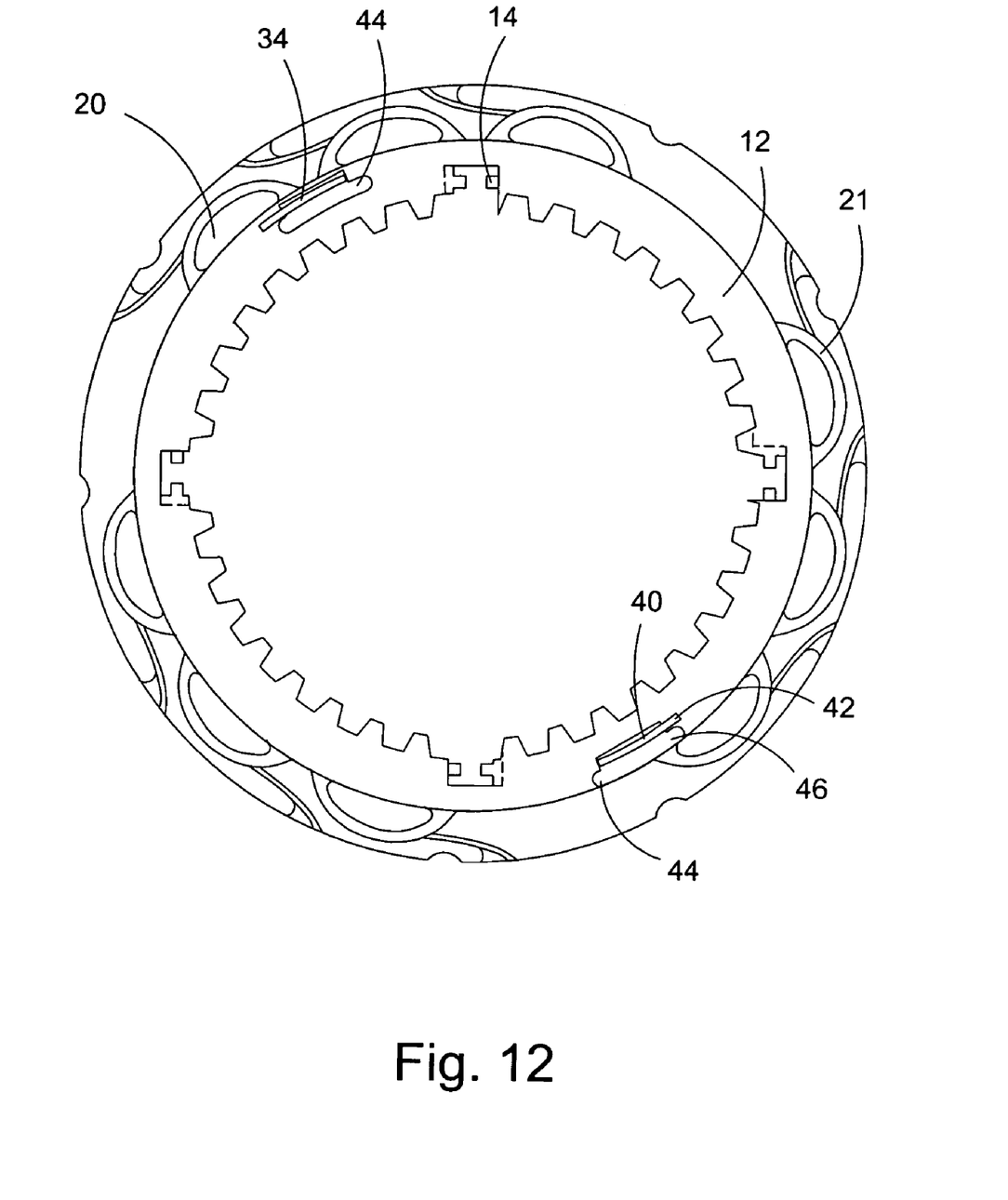

Referring now to FIGS. 11-12, an alternative embodiment of the invention is configured such that the first and second plate assemblies may be translationally secured to one another. In such embodiment, the first plate assembly comprises at least a pair of apertures 44 that are disposed at approximately 180 degree intervals with respect to one another. Similarly, the second plate assembly comprises at least a pair of protruding members 34 for receipt therein. Apertures 44 comprise elongate portions 46 and short portions 48. Elongate portions 46 are sufficiently long to allow protruding portions 34 to be received therein when the first plate assembly is set upon the second plate assembly. Short portions 48 are shorter than elongate portions 46 and are sufficiently short to receive base portion 40 of the protruding members. In combination, however, base portion 40 and blade portion 42 of the protruding members are longer than short portion 48, such that when the first and second plates are translationally disposed with respect to one another and compression springs are inserted between the two plate assemblies, the first plate assembly can be axially secured to the second plate assembly.

In some aspects (not shown), splines 22 and grooves 24 are disposed on outer circumferential surfaces of a pair of assemblies. In such embodiment a plurality of biasing assemblies 18 are disposed between first plate assembly 12 and second plate assembly 14.

Figure 1:
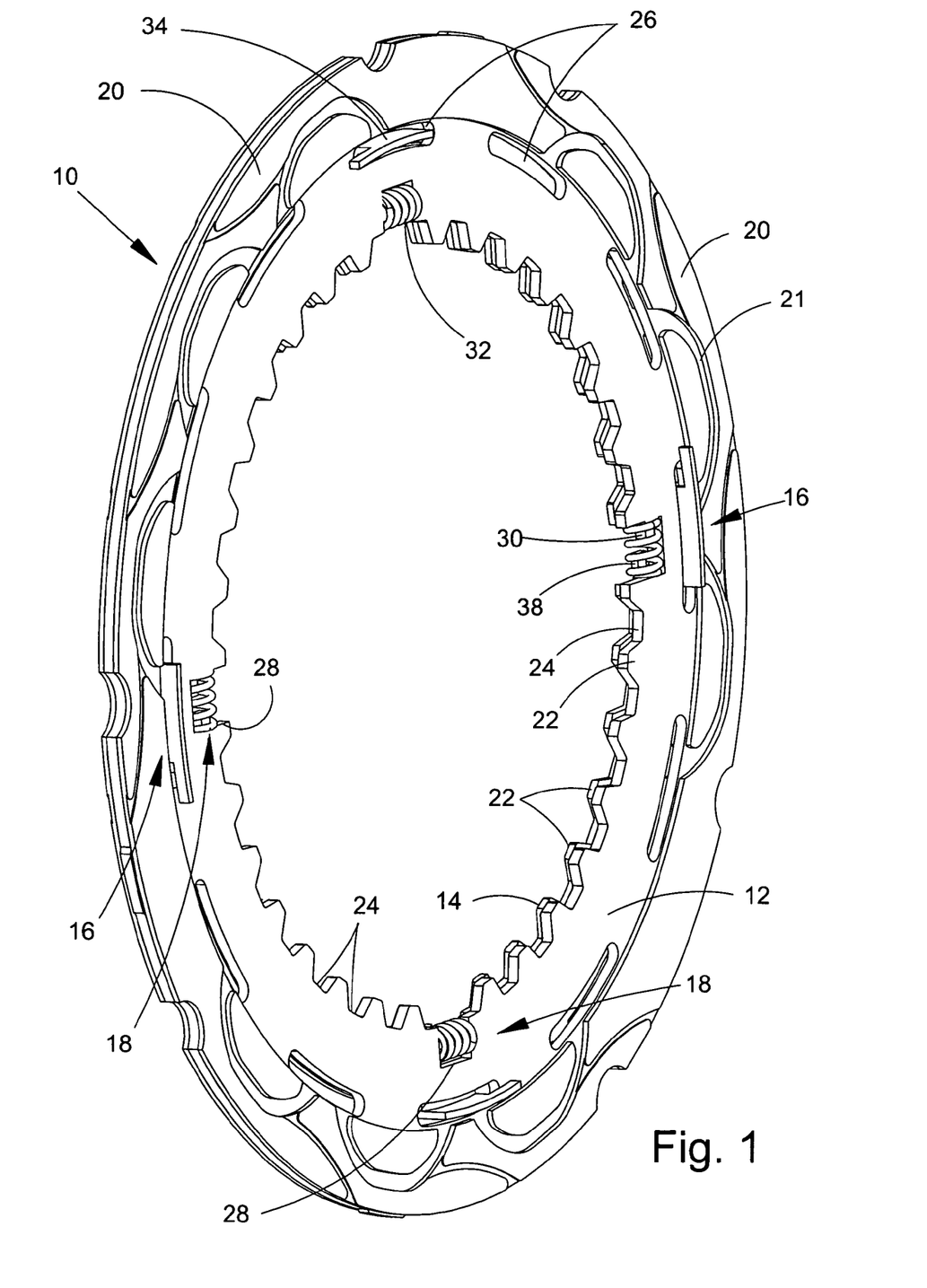
FIGS. 1 and 2 are perspective views of a spline connection according to the invention in relatively resting, and biased, states, respectively.
Figure 2:
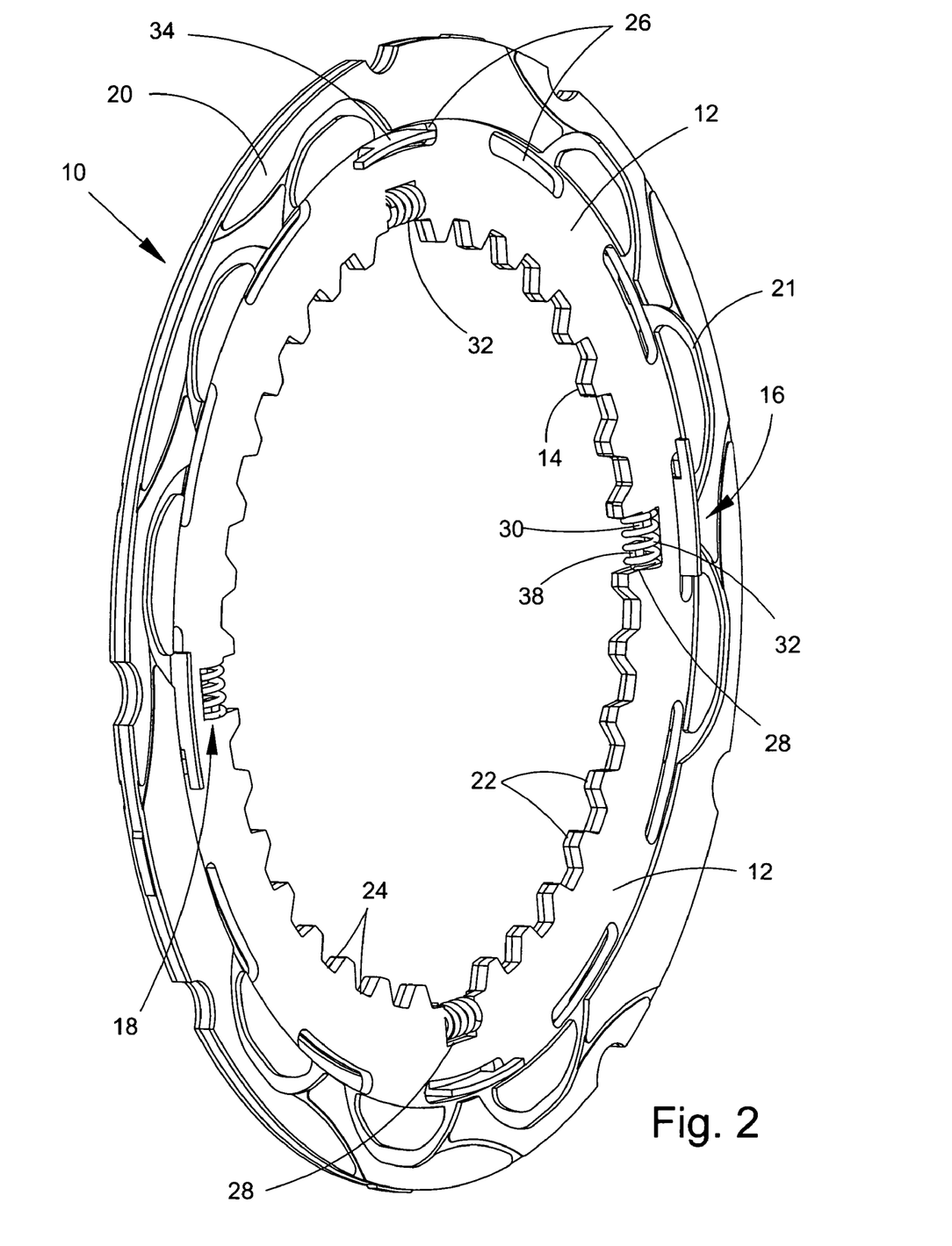
Figure 3:
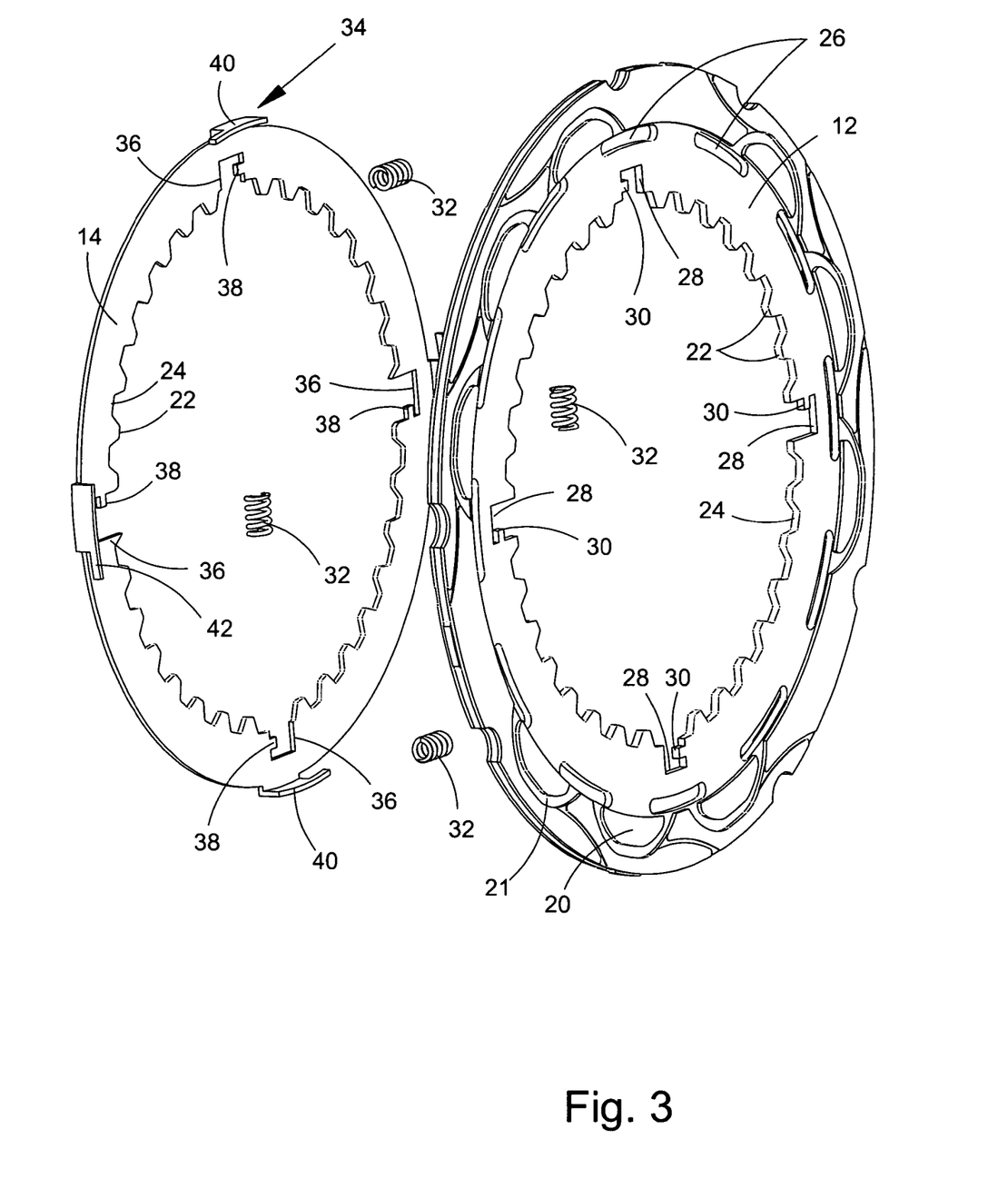
FIG. 3 is an exploded view of a spline connection according to the invention.
Figure 4:
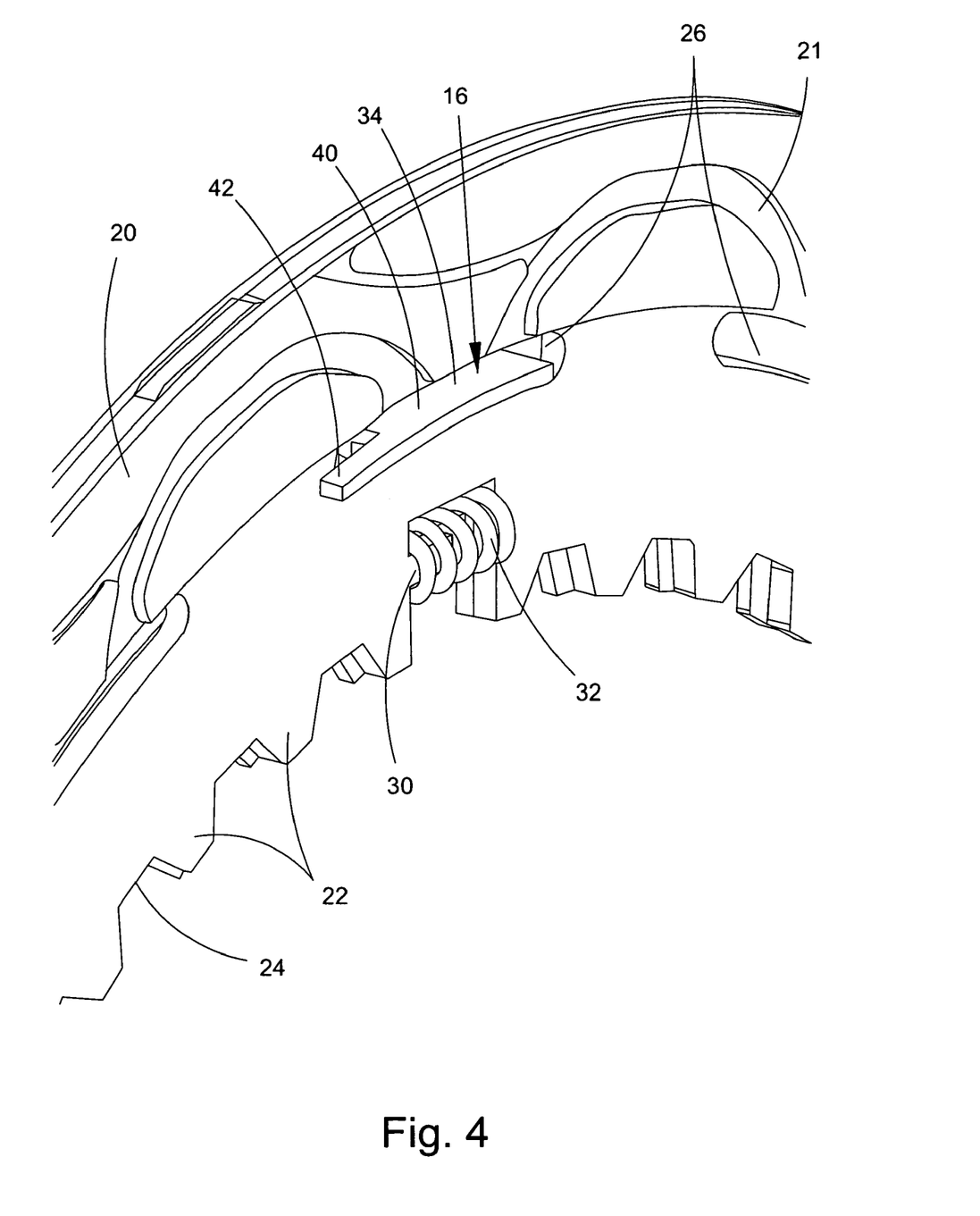
FIG. 4 is a partial close-up view of a spline connection according to the invention.
Figure 5:
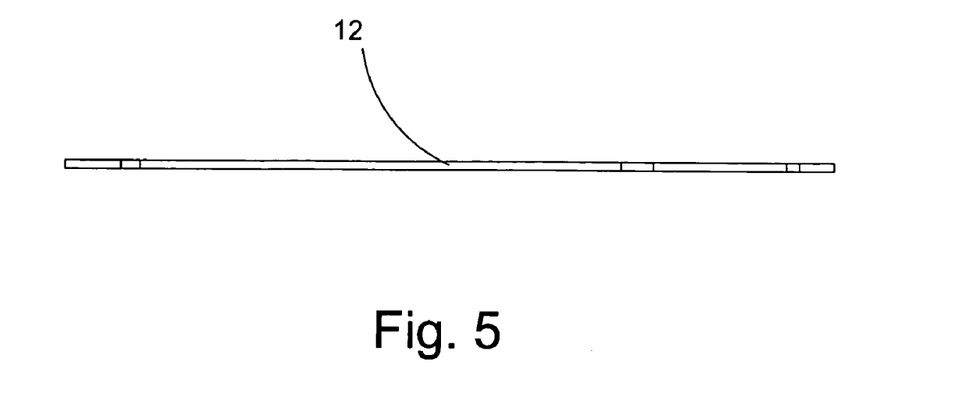
FIG. 5 is a top view of a first plate assembly according to the invention.
Figure 6:
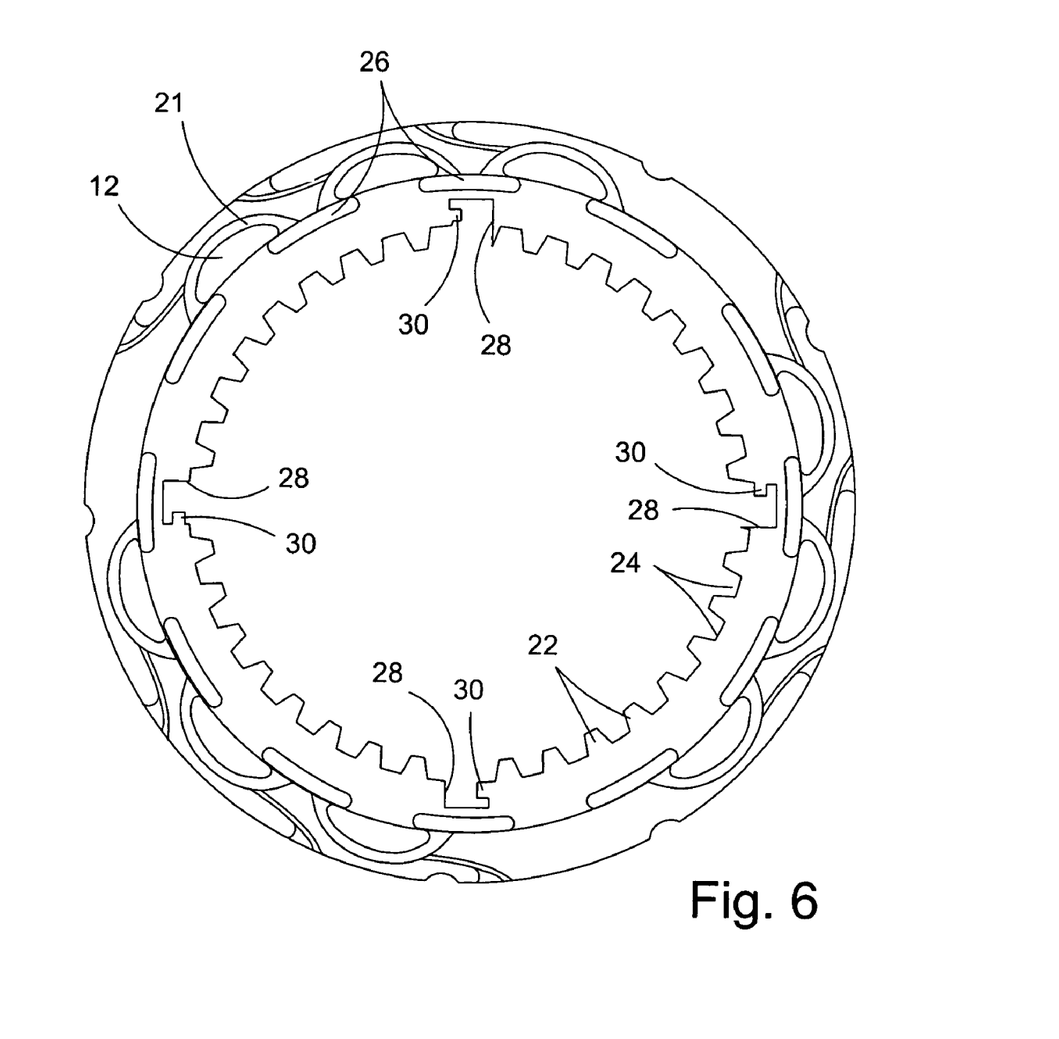
FIG. 6 is a front view of a first plate assembly according to the invention.
Figure 7:
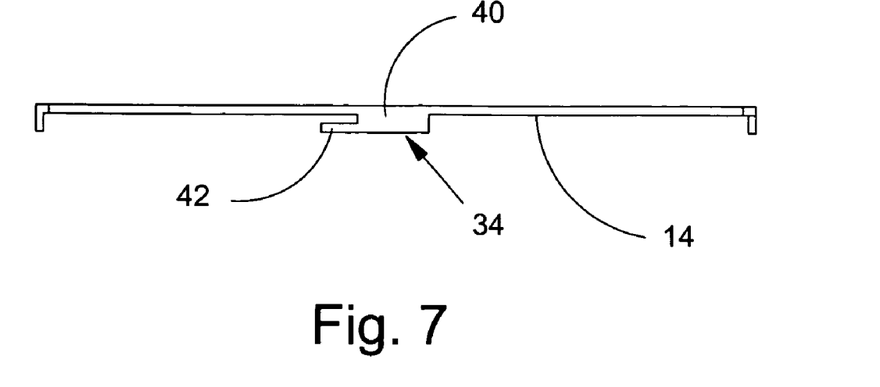
FIG. 7 is a top view of a second plate assembly according to the invention.
Figure 8:
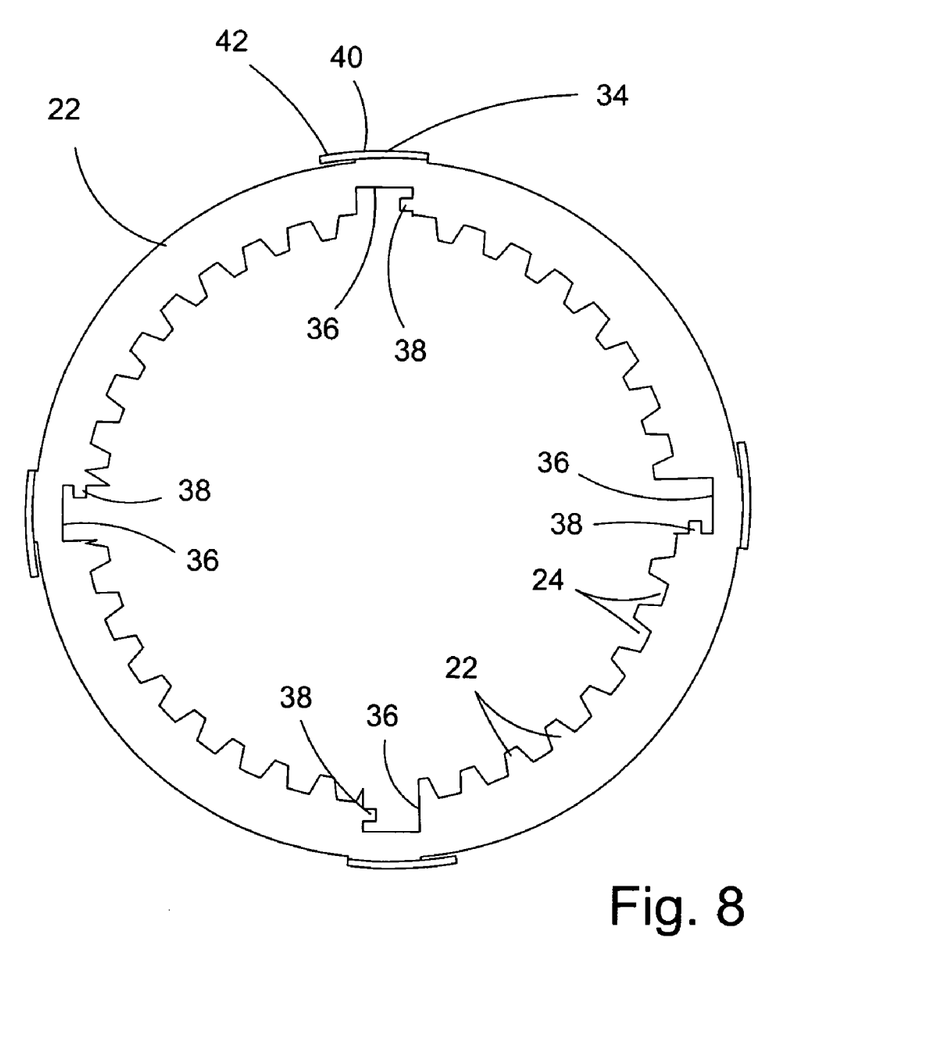
FIG. 8 is a front view of a second plate assembly according to the invention.
Figure 9:
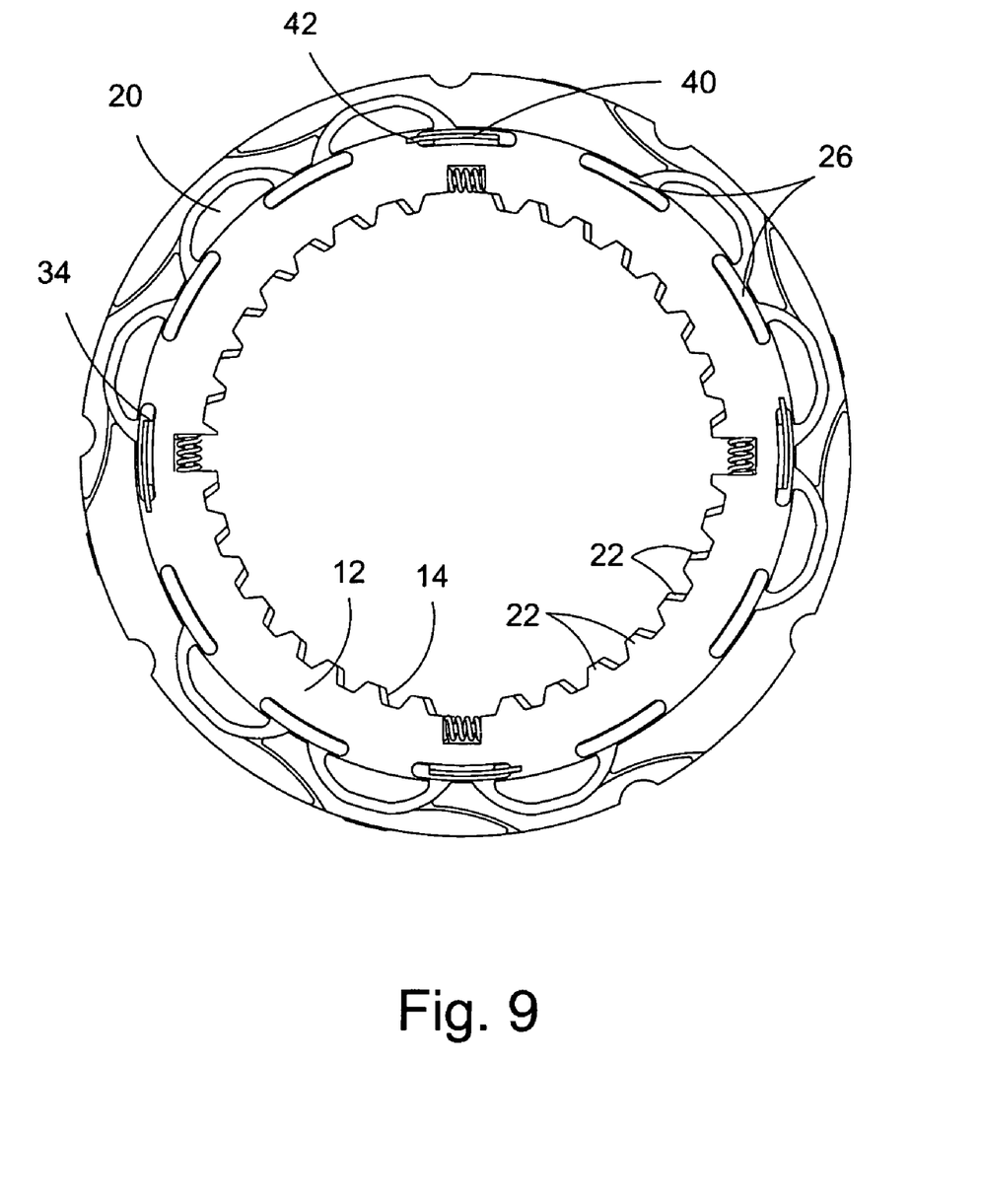
FIG. 9 is a front view of a spline connection according to the invention in a relatively resting state.
Figure 10:
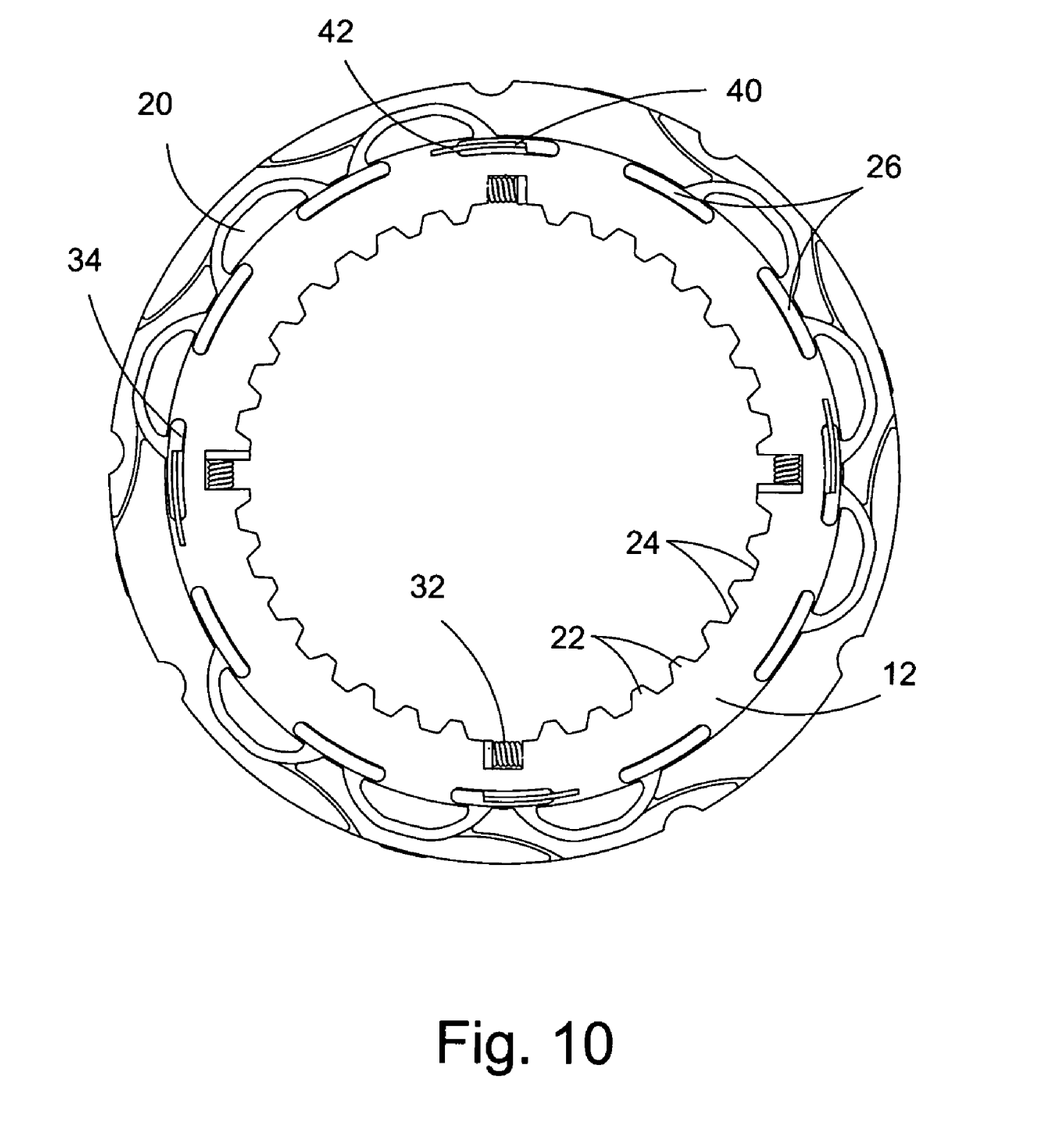

One method of using the invention includes inserting the first or second assembly upon a splined shaft or hub, applying a force to overcome the bias of biasing assembly 18, such that the splines and grooves of the first and second assemblies become aligned with one another as in FIG. 10, further inserting the now aligned first or second assembly upon the splined shaft or hub, and removing the force applied to overcome the bias, which allows the first and second assemblies to become oppositely disposed with respect to one another as in FIG. 9 such that any gaps that may exist between the splined shaft or hub, and splined connecting member may be closed.

Thus, it is seen that the aspects of the present invention are efficiently obtained, is although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

PARTS LIST

10 Improved Spline Connection
12 First Assembly (Plate)
14 Second Assembly (Plate)
16 Fastening Assembly
18 Biasing Assembly
20 Friction Material
21 Channel
22 Spline
24 Groove
26 Aperture
28 Recess (First Plate Assembly)
30 Pin (First Plate Assembly)
32 Spring
34 Protruding Member
36 Recess (Second Plate Assembly)
38 Pin (Second Plate Assembly)
40 Base Portion (Protruding member)
42 Blade Portion (Protruding Member)
44 Aperture
46 Elongated Portion
48 Short Portion

What we claim is:

1. An assembly for improving a spline connection comprises:
   a first assembly comprising a first inner circumference and a first at least one spline disposed on said first inner circumference;
   a second assembly comprising a second inner circumference and a second at least one spline disposed on said second inner circumference;
   an integral fastening assembly arranged to axially fasten said first assembly with respect to said second assembly; and,
   a biasing assembly arranged to oppositely rotationally dispose said first and second assemblies with respect to one another.

2. The assembly of claim 1 wherein said first assembly and said second assembly are each annular.

3. The assembly of claim 2 wherein said biasing assembly is arranged to rotationally misalign said first and second at least one spline.

4. The assembly of claim 2 wherein said biasing assembly is configured to have a range of motion and said first and second at least one spline are alignable within said range of motion.

5. The assembly of claim 2 wherein said biasing assembly comprises at least one compression spring and at least one spring receiving assembly, said at least one compression spring and said at least one spring receiving assembly are tangentially disposed about said first and second assemblies.

6. The assembly of claim 5 wherein said at least one spring comprises first and second ends connected to said first and second assemblies, respectively.

7. The assembly of claim 6 wherein said at least one spring receiving assembly comprises a first pin on the first assembly and a second pin on the second assembly, where said first and second pins are arranged to receive said first and second ends, respectively.

8. The assembly of claim 7 wherein said first pin is oriented in a first rotational direction and said second pin is oriented in a second rotational direction opposite said first direction.

9. The assembly of claim 1 wherein said fastening assembly comprises a protruding member disposed on one of said first and second assemblies and a receiving aperture disposed on the other of said first and second assemblies.

10. The assembly of claim 1 wherein said first assembly is rotatably securable to said second assembly.

11. The assembly of claim 1 wherein said first plate assembly is translationally securable to said second plate assembly.

12. An assembly for improving a spline connection comprises:
    a first assembly comprising a first inner circumference, a first outer circumference, a first at least one spline disposed on said first inner circumference and a friction material disposed on said first outer circumference;
    a second assembly comprising a second inner circumference and a second at least one spline disposed on said second inner circumference;
    an integral fastening assembly arranged to axially fasten said first assembly with respect to said second assembly; and,
    a biasing assembly arranged to oppositely rotationally dispose said first and second assemblies with respect to one another.

* * * * *